Feb. 10, 1925.
S. M. BELLRINGER
1,525,492
VALVE FACING TOOL
Filed July 12, 1922.
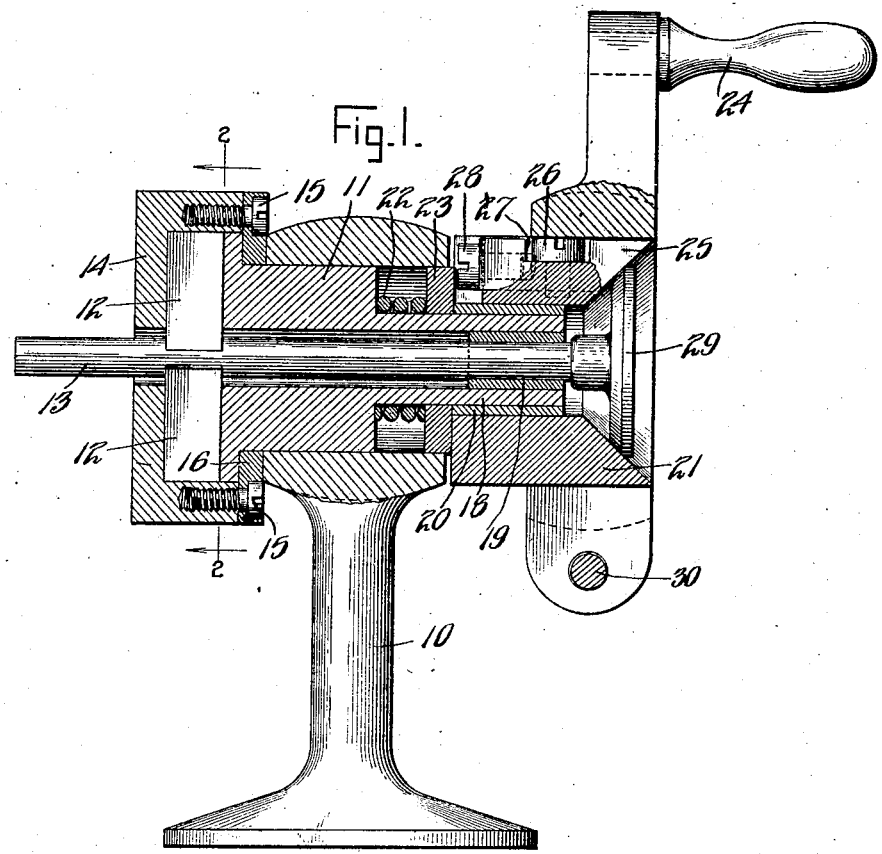
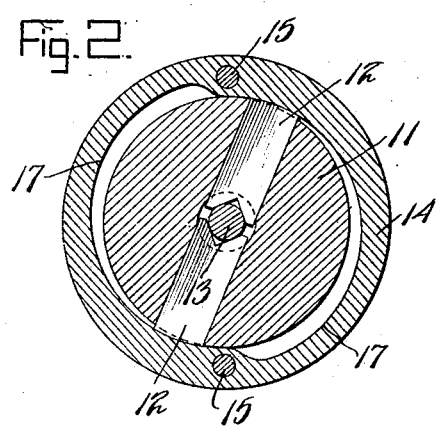
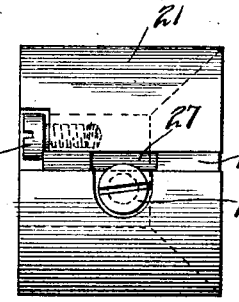
Inventor
Sidney M. Bellringer
By
Attorney Patented Feb. 10, 1925.

1,525,492

UNITED STATES PATENT OFFICE.

SIDNEY M. BELLRINGER, OF WAYNESBORO, PENNSYLVANIA, ASSIGNOR TO WAYNE TOOL MANUFACTURING COMPANY, OF WAYNESBORO, PENNSYLVANIA, A CORPORATION OF PENNSYLVANIA.

VALVE-FACING TOOL.

Application filed July 12, 1922. Serial No. 574,458.

*To all whom it may concern:*

Be it known that I, SIDNEY M. BELLRINGER, a citizen of the United States, residing at Waynesboro, in the county of Franklin and State of Pennsylvania, have invented certain new and useful Improvements in Valve-Facing Tools, of which the following is a specification.

My said invention relates to a tool for facing valves and it is an object of the invention to provide a cutter which shall be fed with exact uniformity at all times into the work and with an even pressure irrespective of the relative positions of the cutter and the work.

A further object is to provide a cutter which shall be in exact alinement at all times with the work.

Still another object is to provide a valve facing tool with a cutter, the operation of which can be limited to a very small amount.

Referring to the accompanying drawings, which are made a part hereof and on which similar reference characters indicate similar parts, Figure 1 is an elevation of the device with parts in section to illustrate the internal construction, Figure 2 a section on line 2—2 of Figure 1, and Figure 3 a plan of the cutter head in one position thereof.

In the drawings reference character 10 indicates a stand having a cylindrical opening in its upper part in which is mounted a mandrel 11. This mandrel is enlarged at its rear end to provide a chuck with opposed transverse recesses in which are mounted a pair of gripping jaws 12 for gripping a valve stem 13. The gripping jaws are held in place by a cap 14 engaging over the enlarged rear end of the mandrel and held in place by screws 15 passing through a collar 16 on a reduced portion of the mandrel and into the cap 14. The cap and collar are adapted to be manually rotated on the mandrel and the cap at its inner circumference has a pair of cam faces 17 adapted to force the jaws 12 together or to release them from gripping engagement with the valve stem.

Beyond the bearing portion of the mandrel 11 is a reduced part 18 and within this is a bushing 19 forming a support for the valve stem and providing a fixed abutment to limit the movement of a spring hereinafter referred to. This bushing is interchangeable with others having central openings of different sizes to provide for the accommodation of valves having stems of various sizes.

On the outer side of the reduced portion of the mandrel a bushing 20 is fixed thereto in any convenient manner and a cutter head 12 is loosely mounted thereon, the cutter head being adapted for rotation and endwise movement on the bushing. Spring 22 surrounds the smaller portion of the mandrel and bears at one end against a fixed abutment in the form of an annular shoulder between said portion and the bearing portion. At the other end the spring presses against a washer 23, the movement of which is limited by the fixed bushing 20.

The cutter head is adapted for rotation by a handle 24 secured to a split collar clamped on the head by a screw 30. The head has a longitudinal slot in which is mounted a cutting blade 25 held in place by the head of a screw 26 engaging a depression 27 in the back of the blade. Another screw 28 has a head engaging the rear end of the blade and serves to adjust the same with relation to the cutter head. Other facing means may be substituted for the cutting blade 25 such as will smooth the face of the valve and bring the entire face to the same level it being immaterial for this purpose whether the operating means actually cuts the metal in the ordinary sense or has an action like that of a grindstone or emery wheel in which the individual particles act as independent cutter-blades of very small relative size.

In the operation of my device a valve 29 is inserted into the central opening of the mandrel, its stem 13 passing between the grippers 12, and is forced back carrying with it the cutter head against the tension of the spring, rearward movement of the cutter head being permitted by the clearance existing between the rear face of the cutter head and the front face of the upper bearing portion of stand 10. When now the handle 24 is turned to rotate the cutter head, the spring 22 will force the washer 23 and the cutter head forward against the beveled face of valve 29 until its movement is arrested by contact of washer 23 with bushing 20.

Various changes may be made in my device without departing from the spirit of the invention and therefore I do not limit myself to the precise mechanism shown in the drawings and described in the specification but only as indicated in the appended claims.

Having thus fully described my said invention, what I claim as new and desire to secure by Letters Patent, is:

1. In a valve facing tool, a mandrel having a central opening, means at one end of the opening for gripping a valve stem, and an interchangeable bushing at the other end of the opening whereby valve stems of various sizes may be supported, substantially as set forth.

2. In a valve facing tool, a mandrel having a central opening, means at one end of the opening for gripping a valve stem, an interchangeable bushing at the other end of the opening whereby valve stems of various sizes may be supported, and a cutter head journaled on the mandrel to act on the face of the valve, substantially as set forth.

3. A cutter head comprising a longitudinally slotted member countersunk at one end, means for rotating the same, a blade in the slot having a face projecting from the wall of the countersunk portion, means for holding the blade in place, and means for moving the same forward to compensate for wear, substantially as set forth.

4. In a valve facing tool, work-holding means comprising a stationary mandrel having a longitudinal central opening, gripping jaws slidably located at the rear end of the mandrel, a retaining cap for said gripping jaws and cam surfaces on the inside of said retaining cap for forcing the jaws into gripping relation with the work and cutting means rotatable relatively to said work-holding means, substantially as set forth.

5. A valve facing device comprising a standard having a horizontal opening, a sleeve in the opening, means at one end of the sleeve for gripping a valve stem, a cutter head rotatably mounted on the other end of the sleeve, and cutting means on the cutter head for engagement with the valve face, substantially as set forth.

6. A valve facing device comprising a standard having a horiozntal opening, a sleeve in the opening, means at one end of the sleeve for gripping a valve stem, an external fixed bushing at the other end of the sleeve, a cutter-head rotatably mounted thereon, and a spring surrounding the sleeve adjacent said bushing and serving to maintain contact between the face of a valve held in said sleeve and the cutting means on the cutter-head, substantially as set forth.

7. A valve facing device comprising a standard having a horizontal opening, a sleeve in said opening having at one end means for holding a valve stem, a spring surrounding a reduced portion of the sleeve said spring bearing at one end against a fixed abutment on the sleeve, a loose washer between the other end of the spring and a second fixed abutment on the stem, and a cutter head having rotary movement about the sleeve said cutter head being also movable lengthwise of the sleeve against the pressure of the spring, substantially as set forth.

8. A valve facing device comprising a standard having a cylindrical upper portion, a mandrel therein said mandrel having a longitudinal opening to receive a valve stem, means carried by the sleeve for gripping the valve stem, means rotatably mounted on the sleeve for acting on the face of the valve, and means concealed within said opening adapted to force the said last-named means yieldably against the valve, substantially as set forth.

In witness whereof, I have hereunto set my hand and seal at Waynesboro, Pennsylvania, this eleventh day of July, A. D. nineteen hundred and twenty-two.

SIDNEY M. BELLRINGER. [L. S.]

Witnesses:
 WM. H. STRAUSS,
 MARGARET L. ANDERS.